United States Patent [19]

Giles, Jr. et al.

[11] 4,427,830

[45] Jan. 24, 1984

[54] POLYETHERIMIDE-POLYPROPYLENE BLENDS

[75] Inventors: Harold F. Giles, Jr., Cheshire; William R. Schlich, Pittsfield, both of Mass.

[73] Assignee: General Electric Company, Pittsfield, Mass.

[21] Appl. No.: 359,506

[22] Filed: Mar. 18, 1982

[51] Int. Cl.³ .................. C08L 79/04; C08L 79/08
[52] U.S. Cl. ................................. 525/180; 525/184
[58] Field of Search ........................... 525/180, 184

[56] References Cited

U.S. PATENT DOCUMENTS 4,255,471 3/1981 Boldebuck .................. 427/385.5

FOREIGN PATENT DOCUMENTS 55-18443 2/1980 Japan.

*Primary Examiner*—Paul Lieberman
*Attorney, Agent, or Firm*—Bernard, Rothwell, & Brown

[57] ABSTRACT

Disclosed are blends of (a) a polyetherimide and (b) a minor amount, e.g., about 1 to about 20 weight %, of polypropylene or copolymer thereof. Unexpectedly, these blends have a higher notched Izod impact strength than that associated with the polyetherimide component of the blends and those associated with other polyetherimide-polypropylene blends which do not contain a minor amount of polypropylene.

9 Claims, 1 Drawing Figure

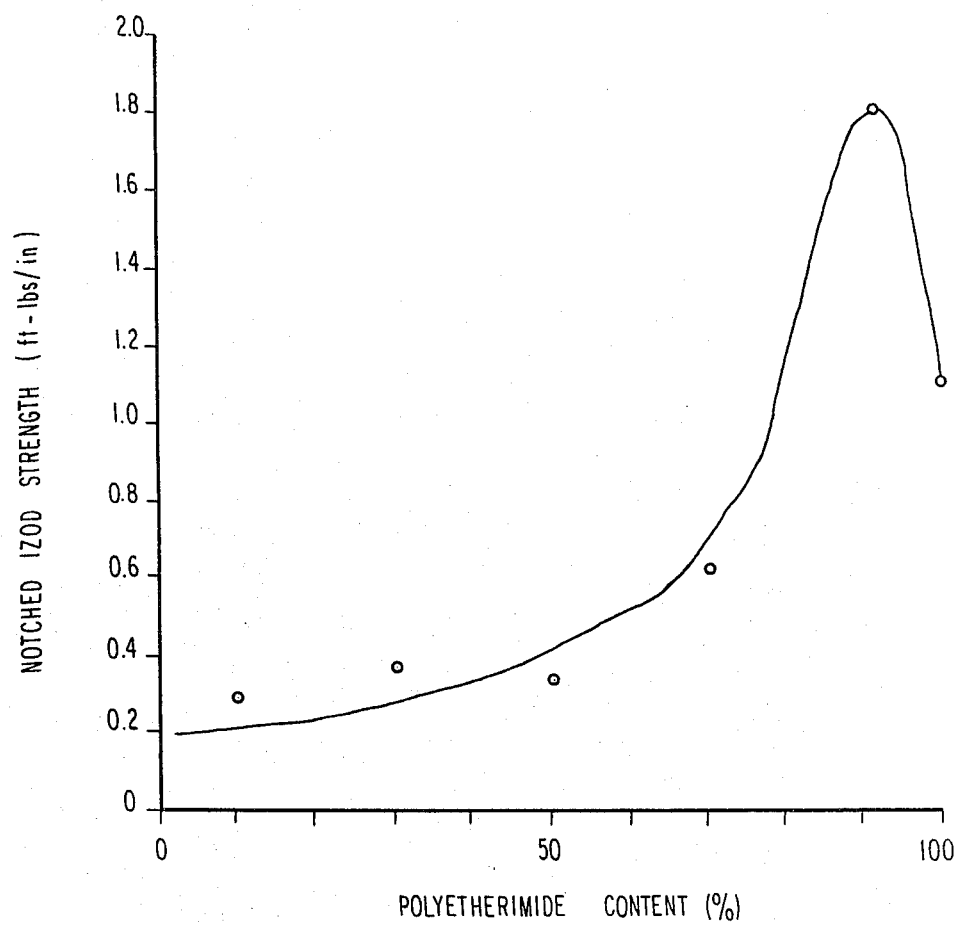

POLYETHERIMIDE-POLYPROPYLENE BLENDS

The subject invention relates to a class of blends containing (a) a polyetherimide and (b) a minor amount, e.g., about 1 to 20 weight %, of polypropylene or copolymer thereof. Unexpectedly, these blends have a higher notched Izod impact strength than that associated with the polyetherimide component of the blends as well as those associated with other polyetherimide-polypropylene blends which do not contain a minor amount of polypropylene.

The blends of the invention include a polyetherimide of the formula:

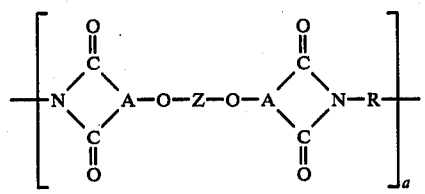

where a represents a whole number in excess of 1, e.g., 10 to 10,000 or more, the group —O—A< is selected from:

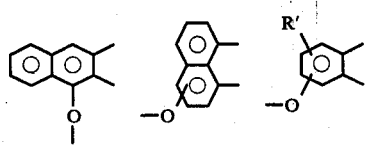

R' being hydrogen, lower alkyl or lower alkoxy, preferably the polyetherimide includes the latter —O—A< group where R' is hydrogen such that the polyetherimide is of the formula:

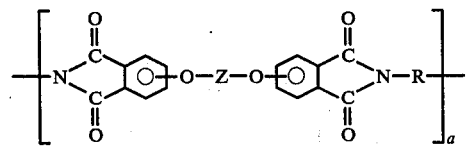

and the divalent bonds of the -O-Z-O- radical are in the 3,3'; 3,4'; 4,3' or the 4,4' position; Z is a member of the class consisting of (1)

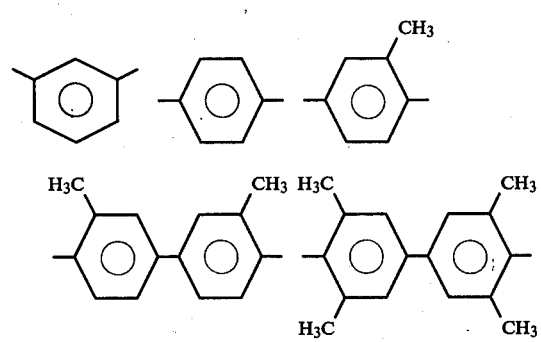

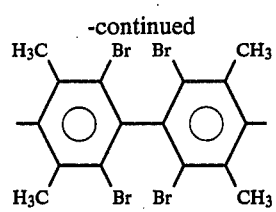

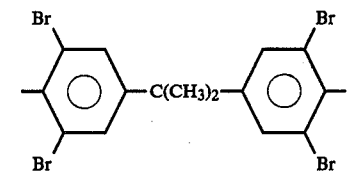

and (2) divalent organic radicals of the general formula:

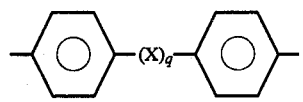

where X is a member selected from the class consisting of divalent radicals of the formulas,

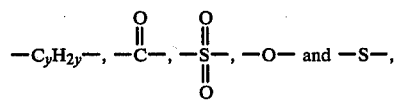

where q is 0 or 1, y is a whole number from 1 to 5, and R is a divalent organic radical selected from the class consisting of (1) aromatic hydrocarbon radicals having from 6-20 carbon atoms and halogenated derivatives thereof, (2) alkylene radicals and cycloalkylene radicals having from 2-20 carbon atoms, $C_{(2-8)}$ alkylene terminated polydiorganosiloxane, and (3) divalent radicals included by the formula

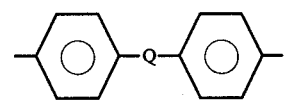

where Q is a member selected from the class consisting of

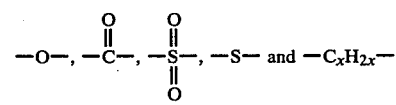

where x is a whole number from 1 to 5 inclusive. Particularly preferred polyetherimides for the purposes of the present invention includes those where —O—A< and Z respectively are:

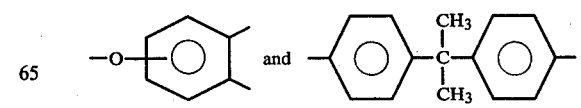

and R is selected from:

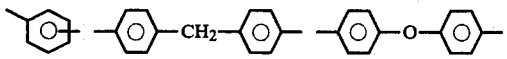

The polyetherimides where R is metaphenylene are most preferred.

The polypropylene used in the blends of the invention are the so-called isotactic polypropylene as opposed to atactic polypropylene and have the structural formula:

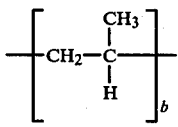

where b is an integer in excess of 100. Generally the number average moleculr weight of polypropylene is typically in excess of about 100,000. Polypropylene of this type are further described in the Kirk-Othmer Encyclopedia of Chemical Technology, Vol. 14, pp. 282-14 307 (1967) and U.S. Pat. Nos. 3,112,300 and 3,112,301, incorporated herein be reference.

Polypropylenes are characterized by low density (sp. gr. about 0.90); high melting point (about 167° C); higher tensile strength, greater rigidity, and better stress crack resistance than high-density polyethylene; high abrasion resistance; excellent dielectric properties; low creep; and a lustrous surface which is highly resistant to acid, alkali, solvent, or other chemical attack.

Propylene homopolymers and copolymers are produced commercially in numerous grades and formulations. Molding and extrusion grades are available in low, medium, and high melt flows as well as medium- or high-impact types, heat-and ultraviolet-radiation-stable formulations, and resins with controlled crystallinity. Copolymerization with relatively small amounts, e.g., from about 1 to about 20% by weight, of other monomers, notably ethylene or other alphaolefin monomers, modifies the polypropylene structure and provides polymers with improved impact properties and reduced brittleness temperatures.

The polyetherimides for the blends of the invention can be obtained by any of the methods well known to those skilled in the art including the reaction of any aromatic bis(ether anhydrides) of the formula

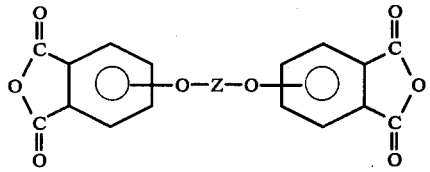

where Z is as defined hereinbefore with an organic diamine of the formula

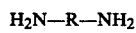

where R is as defined hereinbefore.

Aromatic bis(ether anyhdride)s of the above formula include, for example, 2,2-bis[4-(2,3-dicarboxyphenoxy)-phenyl]-propane dianhydride; 4,4'-bis(2,3-dicarboxyphenoxy)diphenyl ether dianhydride; 1,3-bis(2,3-dicarboxyphenoxy)benzene dianhydride; 4,4'-bis(2,3-dicarboxyphenoxy)diphenyl sulfide dianhydride; 1,4-bis(2,3-dicarboxyphenoxy)benzene dianhydride; 4,4'-bis(2,3-dicarboxyphenoxy) benzophenone dianhydride; 4,4'-bis(2,3-dicarboxyphenoxy)diphenyl sulfone dianhydride; 2,2-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)-diphenyl sulfide dianhydride; 1,3-bis(3,4-dicarboxyphenoxy)benzene dianhydride; 1,4-bis (3,4-dicarboxyphenoxy)benzene dianhydride; 4,4'-bis(3,4-dicarboxyphenoxy)benzophenone dianhydride; 4-(2,3-dicarboxyphenoxy)-4'-(3,4-dicarboxyphenoxy)diphenyl -2,2-propane dianhydride; etc. and mixtures of such dianhydrides.

In addition, aromatic bis(ether anhydride)s also included by the above formula are shown by Koton, M. M.; Florinski, F. S.; Bessonov, M. I.; Rudakov, A. P. (Institute of Heteroorganic Compounds, Academy of Sciences, U.S.S.R.), U.S.S.R. 257,010, Nov. 11, 1969, Appl. May 3, 1967. In addition, dianhydrides are shown by M. M. Koton, F. S. Florinski, Zh Org. Khin 4(5), 774 (1968).

Organic diamines of the above formula include, for example, m-phenylenediamine, p-phenylenediamine, 4,4'-diaminodiphenylpropane, 4,4'-diaminodiphenylmethane, benzidine, 4,4'-diaminodiphenyl sulfide, 4,4'-diaminodiphenyl sulfone, 4,4'-diaminodiphyenyl ether, 1,5-diaminonaphthalene, 3,3'-dimethylbenzidine, 3,3'-dimethoxybenzidine, 2,4-bis($\beta$-amino-t-butyl)toluene, bis(p-$\beta$-amino-t-butylphenyl)ether, bis(p-$\beta$-methyl-o-aminopentyl)benzene, 1,3-diamino-4-isopropylbenzene, 1,2-bis(3-aminopropoxy)ethane, m-xylylenediamine, p-xylylenediamine, 2,4-diaminotoluene, 2,6-diaminotoluene, bis(4-aminocyclohexyl)methane, 3-methylheptamethylenediamine, 4,4-dimethylheptamethylenediamine, 2,11-dodecanediamine, 2,2-dimethylopropylenediamine, octamethylenediamine, 3-methoxyhexamethylenediamine, 2,5-dimethylhexamethylenediamine, 2,5-dimethylheptamethylenediamine, 3-methylheptamethylenediamine, 5-methylnonamethylendediamine, 1,4-cyclohexanediamine, 1,12-octadecanediamine, bis(3-aminopropyl)sulfide, N-methyl-bis(3-aminopropyl)amine, hexamethylenediame, heptamethylenediamine, nonamethylenediamine, decamethylenediamine, bis(3-aminopropyl) tetramethyldisiloxane, bis(4-aminobutyl) tetramethyldisiloxane, etc.

In general, the reactions can be advantageously carried out employing well-known solvents, e.g., o-dichlorobenzene, m-cresol/toluene, etc. in which to effect interaction between the dianhydrides and the diamines, at temperatures of from about 100 to about 250° C.

Alternatively, the polyetherimides can be prepared by melt polymerization of any of the above dianhydrides with any of the above diamino compounds while heating the mixture of the ingredients at elevated temperatures with concurrent intermixing. Generally, melt polymerization temperatures between about 200° to 400° C. and preferably 230° to 300° C. can be employed. The conditions of the reaction and the proportions of ingredients can be varied widely depending on the desired molecular weight, intrinsic viscosity, and solvent resistance. In general, equimolar amounts of diamine and dianhydride are employed for high molecular weight polyetherimides, however, in certain instances, a slight molar excess (about 1 to 5 mol percent) of diamine can be employed resulting in the production of polyetherimides having terminal amine groups. Generally, useful polyetherimides have an intrinsic viscosity $[\eta]$ greater than 0.2 deciliters per gram, preferably 0.35 to 0.60, or 0.7 deciliters per gram or even higher when measured in m-cresol at 25° C.

Included among the many methods of making the polyetherimides are those disclosed in U.S. Pat. Nos. Heath et al., 3,847,867, Williams 3,847,869, Takekoshi et al. 3,850,885, White 3,852,242 and 3,855,178, etc. These disclosures are incorporated herein in their entirety by reference for the purpose of teaching, by way of illustration, general and specific methods for preparing polyetherimides suitable for the blends of this invention.

Suitable polypropylene and its copolymers, as defined previously, can be prepared by methods well known to those skilled in the art or can be obtained commercially. Conventional example, methods for forming polypropylene and copolymers thereof are discussed in the previously mentioned section of the Kirk-Othmer Encyclopedia of Chemical Technology. For example, commercial polypropylenes are generally prepared using a solid, crystalline, hydrocarbon-insoluble catalyst made from a titanium trichloride composition and an aluminum alkyl compound, e.g., triethyl aluminum or diethyl aluminum chloride. Depending on the specific catalyst and polymerization conditions employed, the polymer produced may contain atactic as well as isotactic, syndiotactic or so-called stereo-block molecules. These can be separated, if desired, by selective solvent extraction to yield products of low atactic content that crystallize more completely.

In accordance with the present invention, particularly useful blends of a polyetherimide and polypropylene are obtained when the blends contain a minor proportion of polypropylene. Such blends have a higher notched impact strength than that associated with the polyetherimide component of the blend as well as those of blends not containing a minor proportion of polypropylene. Consequently, blends comprising from about 80 to about 99%, by weight, polyetherimide and from about 20 to about 1% by weight, polypropylene, preferably from about 85 to 95% polyetherimide and from about 15 to about 5 wt. % polypropylene, are included within the scope of the invention.

In general, blends of polyetherimides and polypropylene within the above range can be tailored to provide desired physical characteristics by selecting appropriate proportion of blend components. Relatively higher proportions of polyetherimide within the range usually contribute higher mechanical properties and higher heat deflection temperatures for the blend. Higher proportions of polypropylene, within limits, generally provide higher impact strength for the blend.

The unique characteristics of the blends of the present invention are illustrated in the drawing in which the sole FIGURE is a plot of notched impact strength versus polyetherimide content for a series of blends of a polyetherimide and a polypropylene. The FIGURE is discussed in greater detail below with reference to Example I.

It is contemplated that the polyetherimide-polypropylene blends of the present invention may also include additive materials such as fillers, stabilizers, plasticizers, flexibilizers, surfactant agents, pigments, dyes, reinforcements, flame retardants and diluents in conventional amounts. It is also contemplated that the blends of the invention may include two or more polyetherimides with one or more of polypropylene and its copolymers.

Methods for forming polyetherimide-polypropylene type blends of the invention may vary considerably. Prior art blending techniques are generally satisfactory. A preferred method comprises blending the polymers and additives such as reinforcements in powder, granular or filamentous form, extruding the blend, and chopping the extrudate into pellets suitable for molding by means conventionally used to mold normally solid thermoplastic compositions.

The polyetherimide-polypropylene blends of the present invention have application in a wide variety of physical shapes and forms, including the use as films, molding compounds, coatings, etc. When used as films or when made into molded products, these blends, including laminated products prepared therefrom, not only possess good physical properties at room temperature but they retain their strength and excellent response to workloading at elevated temperatures for long periods of time. Films formed from the blends of this invention may be used in application where films have been used previously. Thus, the blends of the present invention can be used in automobile and aviation applications for decorative and protective purposes, and at high temperature electrical insulation for motor slot liners, transformers, dielectric capacitors, cable and coil wrapping (form would coil insulation for motors), and for containers and container linings. The blends can also be used in laminated structures where films or solutions of the blend are applied to various heat-resistant or other type of materials such as asbestos, mica, glass fiber and the like, the sheets superimposed one upon the other, and thereafter subjecting the sheets to elevated temperatures and pressures to effect flow and cure of the resinous binder to yield cohesive laminated structures. Films made from the subject polyetherimide-polypropylene blends can also serve in printed circuit applications.

Alternatively, solutions of the blends herein described can be coated on electrical conductors such as copper, aluminum, etc. and thereafter the coated conductor can be heated at elevated temperatures to remove the solvent and provide a continuous resinous composition thereon. If desired, an additional overcoat may be applied to such insulated conductors including the use of polymeric coatings, such as polyamides, polyesters, silicones, polyvinylformal resins, epoxy resins, polyimides, polytetrafluoroethylene, etc. The use of the blends of the present invention as overcoats on other types of insulation is not precluded.

Other applications which are contemplated for these blends include their use as binders for asbestos fibers, carbon fibers, and other fibrous materials in making brake linings. In addition, molding compositions and molded articles may be formed from the polymeric blends of the invention by incorporating such fillers as asbestos, glass fibers, talc, quartz, powder, finely divided carbon, silica, and the like into the blends prior to molding. Shaped articles may be formed under heat, or under heat and pressure, in accordance with practices well-known in the art.

The following examples illustrate specific polyetherimide-polypropylene or polyetherimide-polypropylenecopolymer blends in accordance with the present invention. It should be understood that the examples are given for the purpose of illustration and do not limit the invention. In the examples, all parts and percentages are by weight unless otherwise specified.

EXAMPLE I

A series of polyetherimide-polypropylene blends, some according to the invention and some outside the invention, were prepared, the blends molded into test specimens and the specimens tested for various physical properties.

The polyetherimide of the blends was prepared from the reaction product of essentially equimolar amounts of 2,2-bis[4-(3,4-dicarboxy phenoxy)phenyl]propane dianhydride and m-phenylene diamine produced at elevated temperature of about 250° to about 300° C and under a nitrogen atmosphere. The polymer was extruded at about 300° C to form a strand and mechanically chopped into pellets. A test specimen of the polyetherimide was injection molded from the pellets at a temperature of about 685°–700° F. The physical properties of the polyetherimide are set forth in the first line of the following Table I.

The polypropylene used in preparing the blends was a heat resistant polypropylene sold under the tradename Polypropylene 6524 by Hercules, Inc., Wilmington, Del. This polypropylene alone, according to literature, has the properties set forth at the bottom of Table I. To form the blend, about 90 parts of the above polyetherimide were mixed with about 10 parts of the polypropylene. The mixture of the two polymers was then extruded in a Werner & Pfleiderer extruder having a temperature profile varying from about 580° to 630° F. and a die temperature of about 600° F. The resulting extrudate was comminuted into pellets and the pellets injection molded into test specimens in a Battenfield molding machine at a temperature of about 550° F. to 600° F. The impact strength of these specimens was measured according to the unnotched and notched Izod impact test and the results are set forth in the following Table I. The heat distortion temperature, flexural properties and tensile properties of the blend were also determined and are given in Table I.

The above procedure for preparing the blend was then repeated to produce test specimens of four additional blends having varying amounts of polyetherimide relative to the polypropylene. The results of the unnotched and notched Izod impact test, as well as the heat distortion temperature, flexural properties, and tensile properties for these blends are detailed in Table I.

TABLE I

| % Poly-ether-mide | % Poly-pro-pyl-ene | Izod Impact[1] 3.2 mm bar (ft lbs/in) | | HDT °C. @ 1.82 MPa[2] | Flexural Properties[3] | | | Tensile Properties[4] | | | |
|---|---|---|---|---|---|---|---|---|---|---|---|
| | | Notched | Un-notched | | Initial Modulus (PSI × 10⁵) | Strength @ 6.2 mm Defl. (PSI × 10⁴) | Ultimate Strength (PSI × 10⁴) | % | Yield (PSI × 10³) | % | Failure (PSI × 10³) |
| 100 | 0 | 1.08 | 26.5 | 186 | 5.02 | 2.10 | 2.51 | 17.6 | 1.50 | 36 | 12.3 |
| 90 | 10 | 1.79 | 3.66 | 179 | 3.54 | 4.44 | 4.74 | — | — | 6.5 | 5.3 |
| 70 | 30 | 0.606 | 1.44 | 79.4 | 2.69 | — | 0.599 | — | — | 6.3 | 2.88 |
| 50 | 50 | 0.309 | 0.432 | 59.4 | 2.23 | 0.355 | 0.357 | 3 | 1.8 | 6.3 | 1.77 |
| 30 | 70 | 0.385 | 1.72 | 52.2 | 2.16 | 0.478 | 0.478 | 7.5 | 2.59 | 41 | 2.30 |
| 10 | 90 | 0.349 | 2.71 | 48.8 | 1.76 | 0.516 | 0.516 | 13 | 3.43 | 66 | 2.90 |
| 0 | 100[5] | 0.70 | — | 57.8 | 2.75 | — | — | 9.0 | 0.530 | — | — |

[1]Tested according to ASTM method D-256. Unnotched bars contain notch on back side.
[2]Tested according to ASTM method D-648 using a 3.2 mm bar.
[3]Tested according to ASTM method D-790 using a 3.2 mm bar at a 1.27 mm/min crosshead speed.
[4]Tested according to ASTM method D-638 using a Type I bar with a 5.08 mm/min crosshead speed.
[5]From published data In the accompanying drawing, the notched Izod impact strength values from Table I are plotted versus relative concentration of the components of the blends. From the plot, it can be observed that small amounts of polypropylene result in significantly higher notched impact strength values. However, after this initial rise, the notched impact values decrease significantly to about 50:50 blend level after which the values remain relatively constant. Of significance is the fact that the blend containing about 10% polypropylene has a notched Izod impact strength significantly above that of the polyetherimide alone and for blends containing more than about 30% polypropylene.

EXAMPLE II

The basic procedure of Example I was repeated with the exception that a polypropylene copolymer sold under the tradename Polypropylene Copolymer 8501 by Hercules was used. In addition, the extruder temperature profile varied from about 545° to 600° F. and the die temperature used was about 600° F.

As in Example I, test specimens of each blend were tested for notched and unnotched Izod impact strength as well as for heat distortion temperature, flexural properties and tensile properties. These test results for the various blends are set forth in Table II.

TABLE II

| % Poly-ether-mide | % Poly-pro-pyl-ene Co-poly-mer | Izod Impact 3.2 mm bar (ft lbs/in) | | HDT °C. @ 1.82 MPa[2] | Flexural Properties[3] | | | Tensile Properties[4] | | | |
|---|---|---|---|---|---|---|---|---|---|---|---|
| | | Notched | Un-notched | | Initial Modulus (PSI × 10⁵) | Strength @ 6.2 mm Defl. (PSI × 10⁴) | Ultimate Strength (PSI × 10⁴) | % | Yield (PSI × 10⁴) | % | Failure (PSI × 10⁴) |
| 100 | 0 | 1.08 | 26.5 | 186 | 5.02 | 2.10 | 2.51 | 17.6 | 1.50 | 36 | 1.23 |
| 90 | 10 | 1.27 | 2.71 | 163 | 3.21 | 0.485 | 0.519 | — | — | 5.8 | 0.510 |

TABLE II-continued

| % Polyether-mide | % Polypropylene Copolymer | Izod Impact 3.2 mm bar (ft lbs/in) Notched | Izod Impact 3.2 mm bar (ft lbs/in) Unnotched | HDT °C. @ 1.82 MPa[2] | Flexural Properties[3] Initial Modulus (PSI × 10^5) | Flexural Properties[3] Strength @ 6.2 mm Defl. (PSI × 10^4) | Flexural Properties[3] Ultimate Strength (PSI × 10^4) | Tensile Properties[4] % | Tensile Properties[4] Yield (PSI × 10^4) | Tensile Properties[4] % | Tensile Properties[4] Failure (PSI × 10^4) |
|---|---|---|---|---|---|---|---|---|---|---|---|
| 70 | 30 | 0.653 | 18.7 | — | — | — | — | — | — | — | — |

[1]Tested according to ASTM method D-256. Unnotched bars contain notch on back side.
[2]Tested according to ASTM method D-648 using a 3.2 mm bar.
[3]Tested according to ASTM method D-790 using a 3.2 mm bar at a 1.27 mm/min crosshead speed.
[4]Tested according to ASTM method D-638 using a Type I bar with a 5.08 mm/min crosshead speed.

The above data presented in Table II confirms that a minor amount, e.g., about 10% of polypropylene or copolymer thereof, in a blend with a polyetherimide provides a material which has an unexpectedly high notched impact strength. More specifically, it may be observed that the notched Izod impact strength for the 10% polypropylene copolymer blend is about 18% greater than that for the polyetherimide alone and about 95% greater than that for the blend containing 30% polypropylene copolymer.

It is contemplated that substitution of other polyetherimides and/or other polypropylenes for the polyetherimide and/or polypropylenes in the blends of the above examples may result in the formulation of polymer blends having similar characteristics and such blends are considered within the scope of the invention.

While the present invention has been described with reference to particular embodiments thereof, it will be understood that numerous modifications may be made by those skilled in the art without actually departing from the spirit and scope of the invention as defined in the appended claims.

We claim:

1. A composition comprising a blend of (a) an impact resistance-enhancing amount of a polypropylene or copolymer of polypropylene and a single comonomer present in amounts from about 1 to about 20% by weight based on the total weight of the copolymer thereof and (b) a polyetherimide.

2. A composition in accordance with claim 1 wherein the polypropylene or copolymer thereof comprises from about 1 to about 20 weight % of the blend.

3. A composition in accordance with claim 1 wherein the blend contains polypropylene having the structural formula:

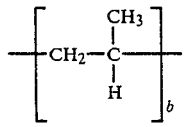

where b is an integer in excess of 100.

4. A composition in accordance with claim 2 wherein the blend contains polypropylene having the structural formula:

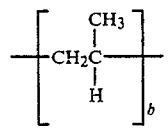

where b is an integer in excess of 100.

5. A composition in accordance with claim 2 wherein the blend contains a polypropylene copolymer.

6. A composition in accordance with claims 1, 2, 3, 4 or 5 wherein the polyetherimide has the formula;

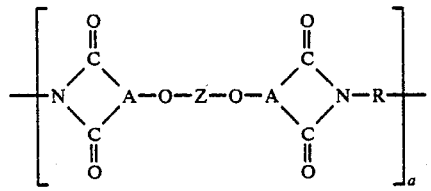

where a represents a whole number in excess of 1, the group —O—A< is selected from:

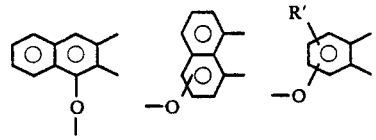

R' being hydrogen, lower alkyl or lower alkoxy, Z is a member of the class consisting of (1)

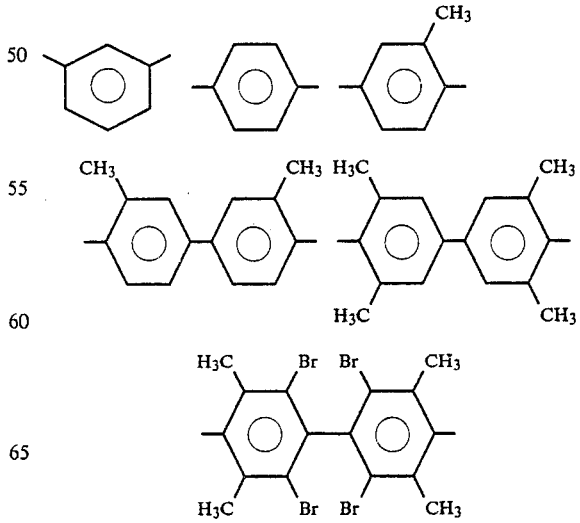

-continued

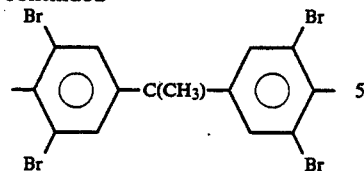

and (2) divalent organic radicals of the general formula:

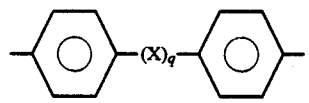

where X is a member selected from the class consisting of divalent radicals of the formulas,

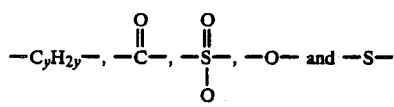

where q is 0 or 1, y is a whole number from 1 to 5, and R is a divalent organic radical selected from the class consisting of (1) aromatic hydrocarbon radicals having from 6–20 carbon atoms and halogenated derivatives thereof, (2) alkylene radicals and cycloalkylene radicals having from 2–20 carbon atoms, $C_{(2-8)}$ alkylene terminated polydiorganosiloxane, and (3) divalent radicals included by the formula

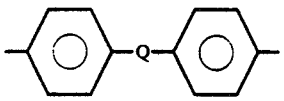

where Q is a member selected from the class consisting of

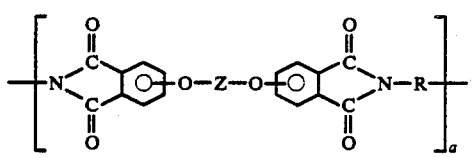

where x is a whole number from 1 to 5 inclusive.

7. A composition in accordance with claim 6 wherein the polyetherimide is of the formula;

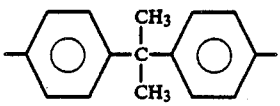

and the divalent bonds of —O—Z—O— radical are in the 3,3'; 3,4'; 4,3' or the 4,4' position.

8. A composition in accordance with claim 7 wherein Z is;

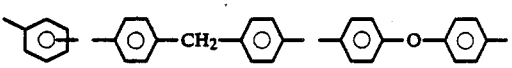

and R is selected from;

9. A composition in accordance with claim 8 wherein the polyetherimide is of the formula:

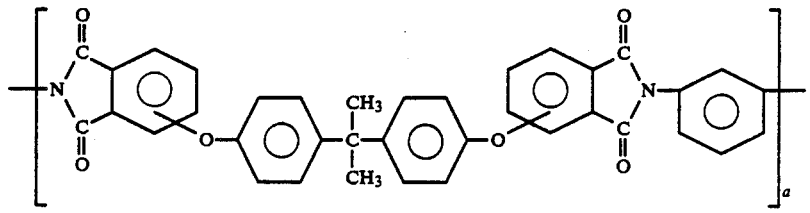

* * * * *

UNITED STATES PATENT AND TRADEMARK OFFICE
CERTIFICATE OF CORRECTION

PATENT NO. : 4,427,830

DATED : January 24, 1984

INVENTOR(S) : Giles, et al.

It is certified that error appears in the above-identified patent and that said Letters Patent is hereby corrected as shown below:

Column 3, line 20, "moleculr" should read --molecular--.
Column 3, line 24, "282-14 307" should read --282-307--.
Column 3, line 25, "be" should read --by--.
Column 3, line 37, "heat-and" should read --heat- and--.
Column 3, line 41, "alphaolefin" should read --alpha-olefin--.
Column 6, line 26, "wrapping" should read --wrappings--.
Column 6, line 26, "would" shuld read --wound--.
Column 7, in Table II, in the headings, after "Izod Impact" insert --1--.
Column 9, ine Table II-continued, in the headings, after "Izod Impact" insert --1--.
Column 11, about line 23, $$\begin{matrix} O \\ \| \\ -S- \\ | \\ O \end{matrix} \quad \text{should be} \quad \begin{matrix} O \\ \| \\ -S-, \\ \| \\ O \end{matrix}$$

Signed and Sealed this

Seventh Day of August 1984

[SEAL]

Attest:

Attesting Officer

GERALD J. MOSSINGHOFF

Commissioner of Patents and Trademarks